US006985784B2

(12) United States Patent
Vandevanter et al.

(10) Patent No.: US 6,985,784 B2
(45) Date of Patent: Jan. 10, 2006

(54) CONFIGURING A CENTRALLY CONTROLLED CIRCUIT BREAKER PROTECTION SYSTEM

(75) Inventors: John S. Vandevanter, East Granby, CT (US); Thomas F. Papallo, Farmington, CT (US); Ellen E. Spahr, Farmington, CT (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 10/373,629

(22) Filed: Feb. 25, 2003

(65) Prior Publication Data

US 2003/0212513 A1 Nov. 13, 2003

Related U.S. Application Data

(60) Provisional application No. 60/438,159, filed on Jan. 6, 2003, and provisional application No. 60/359,544, filed on Feb. 25, 2002.

(51) Int. Cl.
G06F 19/00 (2006.01)

(52) U.S. Cl. .......................... 700/95; 700/286; 700/19; 361/97

(58) Field of Classification Search ......... 700/286–287, 700/290, 95, 18, 19–22; 361/97, 62, 80; 702/64, 702/60
See application file for complete search history.

(56) References Cited

U.S. PATENT DOCUMENTS

| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |

(Continued)

FOREIGN PATENT DOCUMENTS

| EP | 0718948 A2 | 6/1996 |
| EP | 0723325 A1 | 7/1996 |
| EP | 0949734 A2 | 10/1999 |

OTHER PUBLICATIONS

Atanackovic D. et al. An Integrated Knowledge–Based Model For Power–System Planning IEEE Expert, IEEE Inc. New York, Jul. 1997; pp. 65–71.

*Primary Examiner*—Kidest Bahta
(74) *Attorney, Agent, or Firm*—Ohlandt, Greeley, Ruggiero & Perle LLP

(57) ABSTRACT

There is provided a computer-implemented method for configuring a centralized circuit breaker protection system. The method includes determining configuration data for a processor in the centralized circuit breaker protection system in accordance with a parameter relating to an operation of the centralized circuit breaker protection system, and configuring the processor with the configuration data. There is also provided an apparatus for configuring a centralized circuit breaker protection system, and a storage media containing instructions for controlling a computer for configuring a centralized circuit breaker protection system.

23 Claims, 8 Drawing Sheets

U.S. PATENT DOCUMENTS

| | | |
|---|---|---|
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A * | 11/1999 | Hart .......................... 702/64 |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |

| | | |
|---|---|---|
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 * | 2/2001 | Spencer et al. ............... 361/64 |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 | 9/2001 | Alexander et al. |
| 6,291,911 B1 | 9/2001 | Dunk et al. |
| 6,292,340 B1 | 9/2001 | O'Regan et al. |
| 6,292,717 B1 | 9/2001 | Alexander et al. |
| 6,292,901 B1 | 9/2001 | Lys et al. |
| 6,297,939 B1 | 10/2001 | Bilac et al. |
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 * | 5/2002 | Kulidjian et al. ............. 361/62 |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Anderson |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |

* cited by examiner

TABLE 1
EXEMPLARY PARAMETERS

| Customer Sales & Marketing Personnel 405 | System Frequency<br>Number of Breakers<br>Customer LAN Address<br>Nominal System Voltage<br>Breaker Names<br>Local Standards (UL, NEC, etc.)<br>Options/Features:<br>    Protective Relay Modules<br>        Over Voltage<br>        Under Voltage<br>        Voltage Unbalance<br>        Over Frequency<br>    Power Quality Metering<br>    Demand Logging<br>    Waveform Capture<br>    Discrete I/O<br>    Control Schemes<br>    Zone Selective Interlocking<br>    High Resistance Ground Fault<br>    Bus Differential |
|---|---|
| 3$^{rd}$ Party Consultant 410 | Schematic Oneline Diagrams<br>CT/PT Ratings<br>Breaker Ratings<br>Overcurrent Protection Settings:<br>    Long Time<br>    Short Time<br>    Instantaneous<br>    Ground Fault |
| Product Engineer 415 | RealTime OS Versions<br>Firmware Versions<br>Valid Ranges For Protection Settings<br>Ranges For Ratings |

FIG. 5

TABLE 2
CONFIGURING RATING SWITCH VALUE

| Breaker Frame Size (Amps) | CT Rating (Amps) | LT Rating Multiplier | Rating Switch Value ($I_N$) (Amps) |
|---|---|---|---|
| 800 | 150 | 0 | 60 |
| | | 1 | 80 |
| | | 2 | 100 |
| | | 3 | 125 |
| | | 4 | 150 |
| | | Others | 60 |
| | 400 | 0 | 150 |
| | | 1 | 200 |
| | | 2 | 225 |
| | | 3 | 250 |
| | | 4 | 300 |
| | | 5 | 400 |
| | | Others | 150 |
| | 800 | 0 | 300 |
| | | 1 | 400 |
| | | 2 | 450 |
| | | 3 | 500 |
| | | 4 | 600 |
| | | 5 | 700 |
| | | 6 | 800 |
| | | Others | 300 |
| 1600 | 800 | 0 | 300 |
| | | 1 | 400 |
| | | 2 | 450 |
| | | 3 | 500 |
| | | 4 | 600 |
| | | 5 | 700 |
| | | 6 | 800 |
| | | Others | 300 |
| | 1600 | 0 | 600 |
| | | 1 | 800 |
| | | 2 | 100 |
| | | 3 | 1100 |
| | | 4 | 1200 |
| | | 5 | 1600 |
| | | Others | 600 |
| 2000 | 2000 | 0 | 750 |
| | | 1 | 800 |
| | | 2 | 1000 |
| | | 3 | 1200 |
| | | 4 | 1500 |
| | | 5 | 1600 |
| | | 6 | 2000 |
| | | Others | 750 |
| 3200 | 3200 | 0 | 1200 |
| | | 1 | 1600 |
| | | 2 | 2400 |
| | | 3 | 3200 |
| | | Others | 1200 |

FIG. 6

TABLE 3
CONFIGURING
MAXIMUM IOC THRESHOLD

| Breaker Frame Size (Amps) | Maximum Instantaneous Threshold ($\times I_N$) |
|---|---|
| 800 | 15 |
| 1600 | 15 |
| 2000 | 15 |
| 2500 | NA |
| 3200 | 13 |
| 4000 | 9 |
| 5000 | 7 |

FIG. 7

TABLE 4
CONFIGURING GROUND FAULT PICKUP THRESHOLD

| Sensor Rating ($I_{CT}$) (Amps) | Maximum Ground Fault Pickup Threshold ($P_{GF}$) |
|---|---|
| 150–2000 | 0.6 |
| 3200 | 0.37 |
| 4000 | 0.3 |
| 5000 | 0.24 |
| Invalid | 0.24 |

FIG. 8

CONFIGURING A CENTRALLY CONTROLLED CIRCUIT BREAKER PROTECTION SYSTEM

CROSS REFERENCE TO RELATED APPLICATIONS

The present application is claiming priority of U.S. patent application No. 60/359,544 filed on Feb. 25, 2002 for "Integrated Protection, Monitoring, and Control" the contents of which are incorporated by reference herein. The present application is also claiming priority of U.S. patent application No. 60/438,159 filed on Jan. 6, 2003 for "Single Processor Concept for Protection and Control of Circuit Breakers in Low-Voltage Switchgear" the contents of which are incorporated by reference herein.

BACKGROUND OF THE INVENTION

1. Field of the Invention

The present invention relates to a centralized circuit breaker protection system for a power distribution system, and more particularly, to a technique for automatically configuring a processor in a centrally controlled circuit breaker protection system.

2. Description of the Related Art

Industrial power distribution systems commonly divide incoming power into a number of branch circuits, where the branch circuits supply power to various equipment (i.e., loads) in an industrial facility. Circuit breakers are provided in each branch circuit to facilitate protection of equipment within the branch circuit. The circuit breakers can be opened or closed by non-automatic means, and can also be opened automatically when subjected to a predetermined overcurrent. Since this automatic protection is based on conditions of the power (e.g., current), suppliers of circuit breakers have commonly made a large range circuit breakers to meet the various current demands.

The present inventor has developed a unique technique to ensure a proper configuration of components in a centralized circuit breaker protection system for a power distribution system.

SUMMARY OF THE INVENTION

A centralized circuit breaker protection system controls and monitors the power distribution system from a central control processing unit. Configuration of control and protection settings for safe and reliable operation of a power distribution system typically requires substantial training and knowledge of power systems engineering, protective relaying, control systems engineering, and computer systems. Each particular application of such a system may require a different configuration to fulfill its commercial requirements. Manually configuring a circuit breaker protection system is a very labor intensive and time consuming process, and requires skilled technical service personnel to set various components of the system in order to satisfy unique customer specifications.

When a centralized circuit breaker protection system for a power distribution system, is initialized, values are assigned to variable elements in data structures to determine performance characteristics of the centralized circuit breaker protection system. The present invention provides for configuration of a centralized circuit breaker protection system by executing a process that automatically sets variable parameters of the elements of such a system.

One embodiment of the present invention is a computer-implemented method for configuring a centralized circuit breaker protection system. The method includes determining configuration data for a processor in the centralized circuit breaker protection system in accordance with a parameter relating to an operation of the centralized circuit breaker protection system, and configuring the processor with the configuration data. Other embodiments of the present invention are an apparatus for configuring a centralized circuit breaker protection system, and a storage media containing instructions for controlling a computer for configuring a centralized circuit breaker protection system.

BRIEF DESCRIPTION OF THE DRAWINGS

FIG. 5 is a table that provides a list of some exemplary parameters.

FIG. 6 is an illustration of a table that shows an example of how configuration data can be determined from input parameters.

FIG. 7 is an illustration of a table that shows an example of a parameter being used to determine configuration data for a second processor.

FIG. 8 is an illustration of a table showing configuration data that is used for configuring more than one processor.

DESCRIPTION OF THE INVENTION

Figure 1:
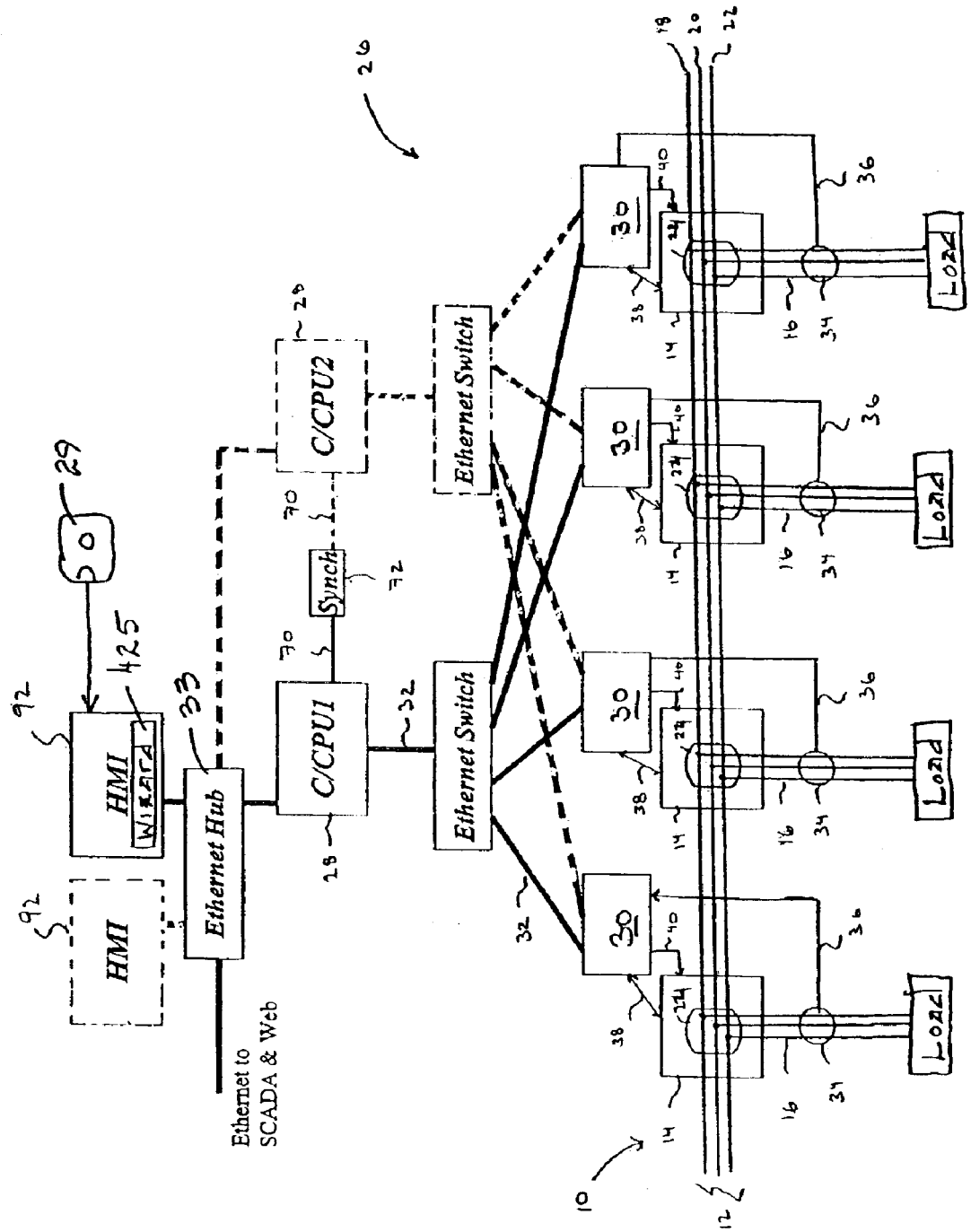
FIG. 1 is a schematic of a power distribution system having an exemplary embodiment of an integrated protection, monitoring, and control system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control protection system 26 (hereinafter "protection system 26"). Protection system 26 is configured to control and monitor power distribution system 10 from a central control processing unit 28 (hereinafter "CCPU 28"). CCPU 28 communicates with a number or plurality of data sample and transmission modules 30 (hereinafter "module 30") over a data network 32. Network 32 communicates all of the information from all of the modules 30 substantially simultaneously to CCPU 28.

Thus, protection system 26 can include protection and control schemes that consider the value of electrical signals, such as current magnitude and phase, at one or all circuit breakers 14. Further, protection system 26 integrates the protection, control, and monitoring functions of the individual breakers 14 of power distribution system 10 in a single, centralized control processor (e.g., CCPU 28). Protection system 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), short time overcurrent, longtime overcurrent, relay protection, and logic control as well as digital signal processing functions of protection system 26. Thus, protection system 26 enables settings to be changed and data to be logged in a single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by protection system 26.

Protection system 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, protection system 26 can be configured to provide a consistent fault response time. As used herein, the fault response time of protection system 26 is defined as the time between when a fault condition occurs and the time module 30 issues a trip command to its associated breaker 14. In an exemplary embodiment, protection system 26 has a fault response time that is less than a single cycle of the 60 Hz (hertz) waveform. For example, protection system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, protection system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at CCPU 28. In addition, CCPU 28 can perform one or more monitoring functions on the centrally located system information. Accordingly, protection system 26 provides a coherent and integrated protection, control, and monitoring methodology not considered by prior systems. For example, protection system 26 integrates and coordinates load management, feed management, system monitoring, and other system protection functions in a low cost and easy to install system.

Figure 2:
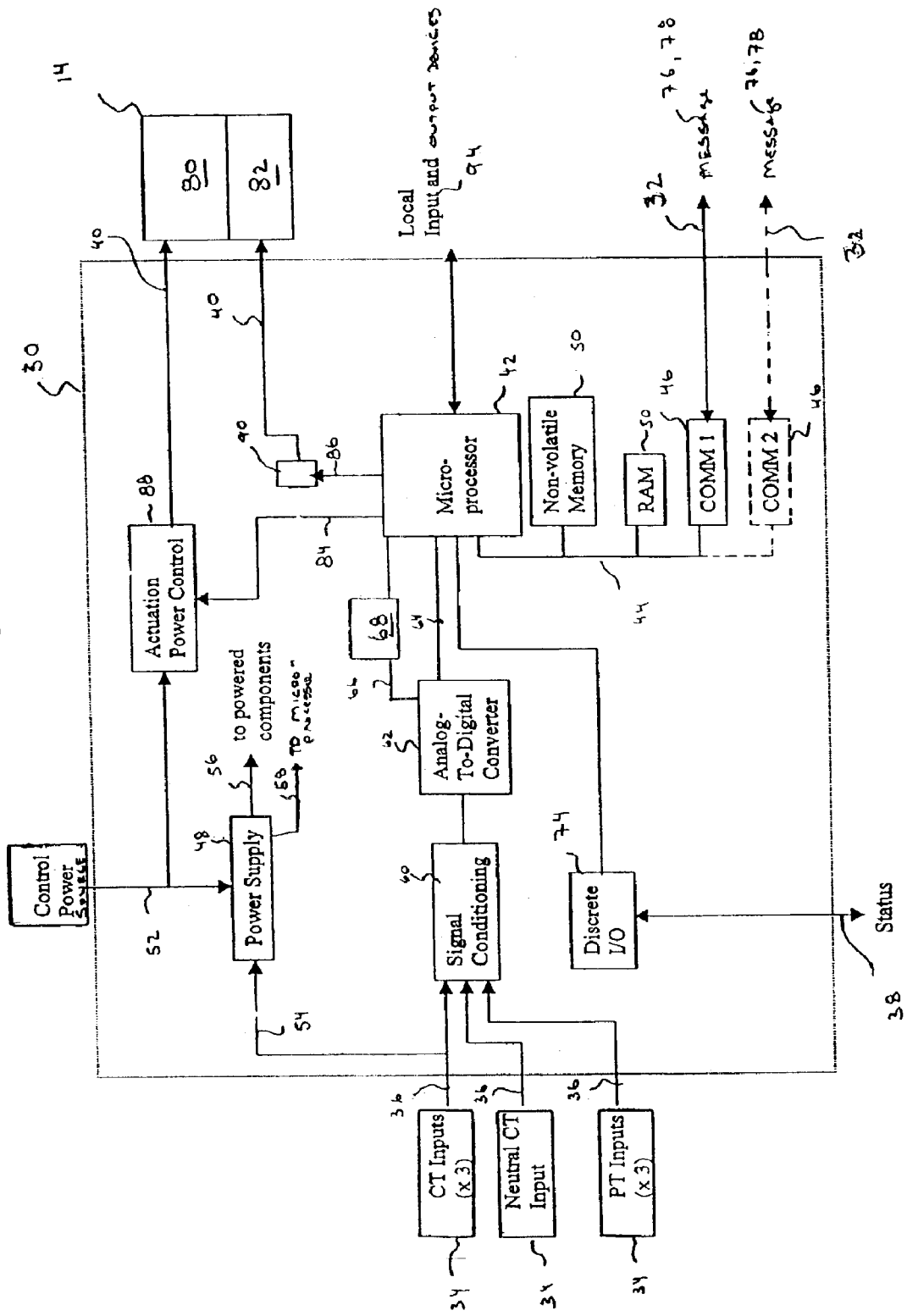
FIG. 2 is a schematic of an exemplary embodiment of a data sample and transmission module of the integrated protection, monitoring, and control system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, protection system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in protection system 26 to be collected at substantially the same time. Specifically, it is desired for digital signals 64 from all of the modules 30 in protection system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in protection system 26 to ensure that the sampling (i.e., digital signals 64) from all of the modules in the system are synchronized.

Accordingly, protection system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of protection system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by protection system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24) circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to second message 78 regardless of the state of first and second sources 52, 54.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, protection system 26 can control each circuit breaker 14 based on the information from that breaker alone, or in combination with the information from one or more of the other breakers in the protection system 26. Under normal operating conditions, protection system 26 performs all monitoring, protection, and control decisions at CCPU 28.

Since the protection and monitoring algorithms of protection system 26 are resident in CCPU 28, these algorithms can be enabled without requiring hardware or software changes in circuit breaker 14 or module 30. For example, protection system 26 can include a data input/output device 92, such as a human-machine-interface (HMI), in communication with CCPU 28. Data input/output device 92 allows a user to provide data and commands for use by protection system 26, and to receive messages and other information from protection system 26. An exemplary embodiment of data input/output device 92 is processor with a keyboard and a display. In the embodiment of protection system 26 shown in FIG. 1, data input/output device 92 is coupled to CCPU 28 via a network 33. Network 33 includes an Ethernet hub having links connected thereto. One or more attributes and functions of the protection and monitoring algorithms resident on CCPU 28 can easily be modified from data input/output device 92.

Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by protection system 26 can reduce this number by over sixty percent. Thus, protection system 26 can resolve the inventory issues, retrofittability issues, design delay issues, installation delay issues, and cost issues of prior power distribution systems.

It should be recognized that protection system 26 is described above as having one CCPU 28 communication with modules 30 by way of a single network 32. However, it is contemplated by the present disclosure for protection system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, protection system 26 would remain operative even in case of a failure in one of the redundant systems.

Modules 30 can further include one or more backup systems for controlling breakers 14 independent of CCPU 28. For example, protection system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

A wizard is a utility that helps a user of a processor to complete a particular task. Referring again to FIG. 1, note that protection system 26 also includes a configuration utility, i.e., wizard 425, for configuring and testing components of system 26. Wizard 425 determines configuration data for CCPU 28 based on a parameter relating to operation of protection system 26, and configures CCPU 28 in accordance with the configuration data. For example, wizard 425 may receive a parameter that designates a valid range for a protection setting for protection system 26, and, in turn, determines configuration data for CCPU 28 to operate in accordance with the protection setting. Wizard 425 can also be employed for configuring modules 30.

Wizard 425 is contemplated as being computer implemented. As such, wizard 425 can be implemented in software, firmware or as a discrete circuit. When implemented in software, wizard 425 is installed into a memory, such as a memory associated with data input/output device 92 or another configuration computer. However, wizard 425 can reside on an external storage media 29 for subsequent loading into data input/output device 92. Storage media 29 can be any conventional storage media, including, but not limited to, a floppy disk, a compact disk, a magnetic tape, a read only memory, or an optical storage media. Storage media 29 could also be a random access memory, or other type of electronic storage, located on a remote storage system and coupled to CCPU 28. Although wizard 425 is shown in FIG. 1 as being installed within data input/output device 92, it can be a stand-alone module coupled to network 33 or it may be located on a remote system (not shown) that is coupled to protection system 26. The operation of wizard 425 is described in greater detail below, in association with FIG. 4.

Figure 3:
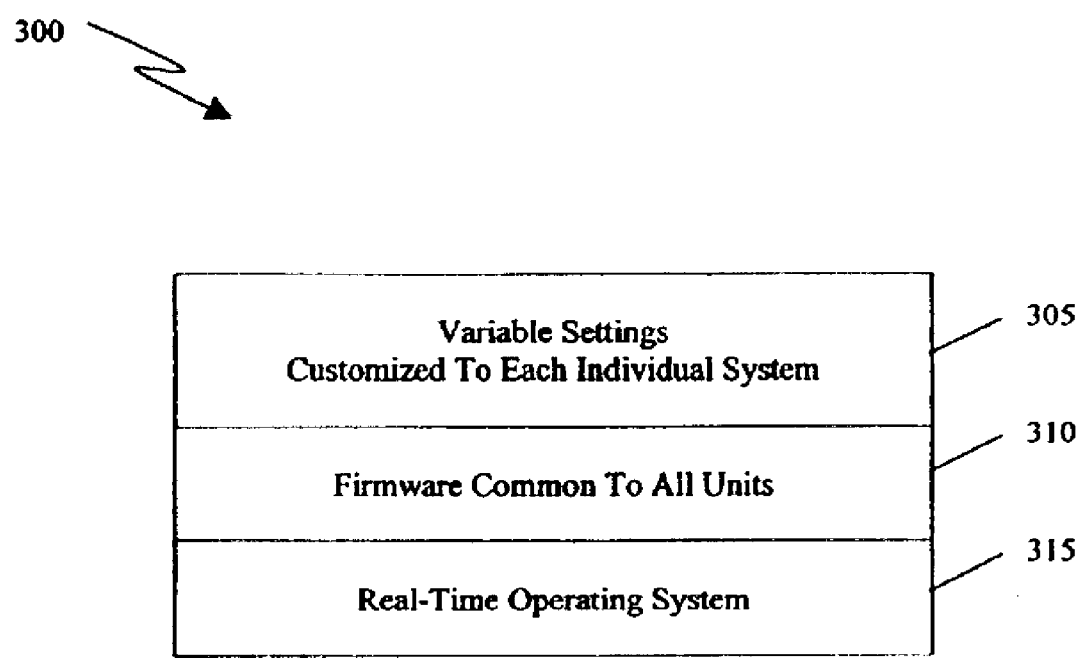
FIG. 3 is a block diagram of an arrangement of data in a memory associated with a processor of FIG. 1.

FIG. 3 is a block diagram of an arrangement of data 300 in a memory associated with either of CCPU 28 or module 30. Data 300 includes variable settings 305, firmware code 310 and an operating system 315.

Variable settings 305 represent data elements that are customized for each individual protection system 26. These data elements may be further customized for a particular CCPU 28 or module 30.

Firmware code 310 represents data for programmable components such as that used for a state machine or a memory controller. Firmware code 310 is typically standardized to a revision level, and therefore may be regarded as being independent of the unique requirements of a particular protection system 26. Nevertheless, firmware code 310 may be subject to an occasional update.

Operating system 315 is a real-time operating system, for example VX Works, which is available from Wind River Systems, Inc., 500 Wind River Way, Alameda, Calif. 94501. Such an operating system is also conventionally known as an embedded operating system. Operating system 315 may be subject to an occasional update.

Configuring data 300, that is, installing or updating any of variable settings 305, firmware code 310 or operating system 315, when performed manually, can be a time consuming task. Furthermore, as the size or complexity of system 10 increases, typically, so does the size and complexity of protection system 26, and likewise of data 300. Thus, manual configuration can present many opportunities for erroneous data entry, and consequently, faulty operation of protection system 26. The configuration of processors in protection system 26 also requires a specialized, yet diverse, set of skills. For example, a person performing such a configuration must typically have some familiarity with customer requirements, electrical power systems, overcurrent protection, protective relaying, software configuration, control logic programming and communications networks.

Figure 4:
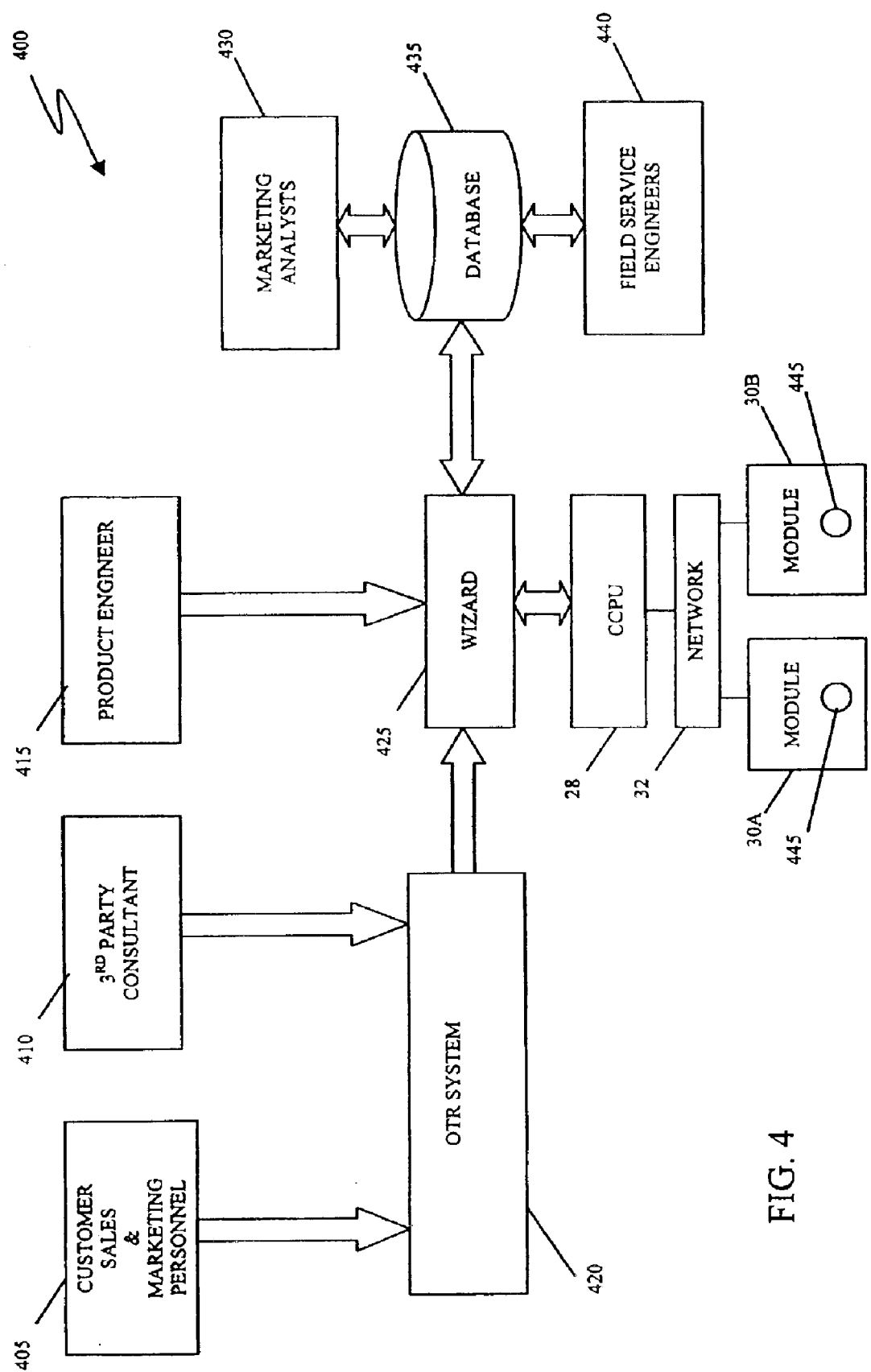
FIG. 4 is a functional block diagram of a macro system for configuring a processor in a centralized circuit breaker protection system.

FIG. 4 is a functional block diagram of a macro system 400 for configuring a processor in a centralized circuit breaker protection system, e.g., protection system 26. Wizard 425, CCPU 28, network 32, and modules 30 (shown in FIG. 4 as modules 30A and 30B) were introduced above. System 400 includes several prospective participants, namely, customer sales and marketing personnel 405, a 3$^{rd}$ party consultant 410, a product engineer 415, marketing analysts 430 and field service engineers 440, and also includes an order-to-remittance (OTR) system 420 and a database 435. Customer sales and marketing personnel 405, consultant 410 and product engineer 415 access protection system 26 via an interface device such as data input/output device 92 to provide parameters relating to an operation of protection system 26.

OTR system 420 receives parameters from customer sales and marketing personnel 405 and consultant 410, and passes the parameters to wizard 425. OTR system 420 may include an order entry tool for sales people, a list of choices that may be made with respect to a configuration of ordered products, inventory management and parts ordering systems for factories, work order processing, dispensing of options to products that are ordered, manufacturing flow tracking for individual orders, and shipping information and tracking.

FIG. 5 is a table, namely, Table 1, that provides a list of some exemplary parameters that may be provided by customer sales and marketing personnel 405, consultant 410 and product engineer 415. For example, customer sales and marketing personnel 405 may specify a number of breakers for system 10, and thus, protection system 26 will manage that number of breakers. Table 1 is not intended as an exhaustive list of parameters.

Wizard 425 is implemented as part of an interactive interface that assists a user, such as product engineer 415, to perform the configuration of protection system 26. Wizard 425 provides step-by-step instructions for entering parameters for configuring protection system 26 and automatically configures data elements for the processors of protection system 26. Thus, wizard 425 enables a wide range of personnel to configure protection system 26 with minimal time and minimal prerequisite knowledge.

Wizard 425 receives the parameters from OTR system 420 and product engineer 415, determines configuration data for CCPU 28 and modules 30A and 30B in accordance with the parameters, and configures CCPU 28 and modules 30A and 30B with the configuration data. Configuring CCPU 28 and modules 30A and 30B can involve (a) configuring software in CCPU 28 and modules 30A and 30B, (b) configuring firmware in CCPU 28 and modules 30A and 30B, (c) installing software in CCPU 28 and modules 30A and 30B, and (d) updating an operating system in CCPU 28 and modules 30A and 30B.

Organization of information to be entered is also a feature of wizard 425 that can save time and reduce the amount of requisite domain knowledge required by an operator. By grouping information to be entered into discrete, limited sets within a construct of a series of sequential screens, the operator need only consider information relevant to singular or basic decisions, in the precise logical order in which it is necessary for them to be considered, thereby further simplifying the configuration process.

FIG. 6 is an illustration of a table, namely, Table 2, that shows an example of how configuration data can be determined from input parameters. Table 2 includes four columns, i.e., breaker frame size, CT rating, LT rating multiplier, and rating switch value. Breaker frame size refers to a current handling capability of a breaker. CT rating refers to a current transformer rating. LT rating multiplier refers to a multiplying constant for extending a long-time overcurrent rating. Rating switch value refers to a derating of a breaker for limiting current in the breaker to a value that is less than the breaker is capable of handling. In the present example, breaker frame size, CT rating and LT rating multiplier are input parameters, and rating switch value is the determined configuration. Note that the parameters and configuration data of Table 2 are exemplary, and not intended as an exhaustive illustration of input parameters or configuration data.

Assume that product engineer 415 wishes to configure CCPU 28 for a rating switch value. Product engineer 415 accesses wizard 425 via data input/output device 92.

Wizard 425 prompts product engineer 415 for a breaker frame size, and more particularly offers product engineer 415 an opportunity to select from four possible breaker frame sizes, i.e., 800, 1600, 2000 and 3200 Amps. Assume product engineer 415 selects a breaker frame size of 800 Amps.

Wizard 425 then prompts product engineer 415 to select a CT rating from a limited set of 150, 400 and 800 Amps. That is, wizard 425 only offers product engineer 415 a valid set of CT ratings. Note, for example, that if product engineer 415 had previously selected a breaker frame size of 1600 Amps, then wizard 425 would have offered CT ratings of 800 and 1600 Amps. However, since product engineer 415 selected a breaker frame size of 800 Amps, the option of selecting a CT rating of 1600 Amps is not available. Product engineer 415 does not need detailed knowledge of what values of a parameter are allowable in view of previously selected parameters. By limiting the selection of CT ratings only to a valid set, wizard 425 prevents product engineer 415 from inadvertently entering a value for a parameter that is invalid in light of a previously selected parameter, and helps to minimize the opportunity for product engineer 415 to specify an invalid or unsafe combination of breaker frame size and CT rating. Furthermore, wizard 425 either requires product engineer 415 to enter a value for a parameter, or assigns a default value to the parameter. For the present example, assume that product engineer 415 selects a CT rating of 150 Amps.

Wizard 425 then prompts product engineer 415 to select an LT rating multiplier from a limited set of values. Assume that product engineer 415 selects an LT rating multiplier of 0.

Wizard 425 automatically determines the rating switch value to be 60 Amps, and furthermore, determines the appropriate configuration data to configure CCPU 28 with a rating switch value of 60 Amps. Thereafter, wizard 425 configures CCPU 28 with the configuration data.

Although the present example was introduced above as indicating that product engineer 415 wished to configure the rating switch value for CCPU 28, product engineer 415 need not even be aware that wizard 425 determined the rating switch value. In other words, wizard 425 relieves product engineer 425 of the responsibility of knowing which particular configuration data is being determined and knowing which particular processor is being configured. Note also that wizard 425 may have received, in addition to the parameters from product engineer 415, other parameters from personnel 405 or consultant 410. Wizard 425 determines the configuration data to be consistent with all of the parameters.

With reference to Table 2, recall that wizard 425 used breaker frame size, CT rating, LT rating multiplier to determine the rating switch value for configuring CCPU 28. However, a parameter can serve as a basis for determining configuration data for more than one processor in protection system 26. When wizard 425 uses an input parameter for determining more than one configuration setting, product engineer 415 does not need to enter a value for that parameter for each individual configuration.

FIG. 7 is an illustration of a table, namely, Table 3, that shows an example of a parameter being used to determine configuration data for a second processor. Table 3 includes two columns, i.e., breaker frame size and maximum instantaneous threshold. In Table 2, wizard 425 used breaker frame size to determine the rating switch value for CCPU 28. In Table 3, wizard 425 uses breaker frame size to determine maximum instantaneous threshold for configuring a module 30, assume module 30A. Recalling that product engineer 415 selected breaker frame size of 800 Amps, wizard 425 would determine maximum instantaneous threshold to be 15, and would configure module 30A accordingly.

Assume that module 30A controls a first circuit breaker and that module 30B controls a second circuit breaker. Based on the parameters, wizard 425 can determine a first version of configuration data for module 30A and a second version of configuration data for module 30B, and, the first version can be different from the second version. Furthermore, wizard 425 can determine a configuration setting that can be applied to all of module 30A, module 30B and CCPU 28.

FIG. 8 is an illustration of a table, namely, Table 4, showing an example of configuration data that is used for configuring more than one processor. Table 4 has two columns, i.e., sensor rating and maximum ground fault pickup threshold. Sensor rating is an input parameter and maximum ground fault pickup threshold is a configuration setting that is applied to both CCPU 28 and modules 30A and 30B.

Recall that in the discussion of Table 2, product engineer 415 selected a value of 150 Amps for CT rating. CT rating is also known as sensor rating. Thus, with reference to Table 4, the selection of 150 Amps for CT rating corresponds with a sensor rating in the range of 150–2000 Amps. Wizard 425 automatically determines the maximum ground fault pickup threshold value to be 0.6, determines corresponding configuration data for CCPU 28 and configuration data for modules 30A and 30B, and configures CCPU 28 and modules 30A and 30B with their respective configuration data.

The manner in which data is organized and represented in CCPU 28 is likely to be different from the manner in which data is organized and represented in modules 30A and 30B. Accordingly, the configuration data for modules 30A and 30B may be different from the configuration data for CCPU 28. Nevertheless, wizard 26 configures and formats the configuration data as required by each of CCPU 28 and modules 30A and 30B.

Some settings such as delay band constants, cooling time constants, alarm parameters are generally not of immediate interest with respect to getting a system up and running. For such settings, calculated or default values can be automatically determined based on other more critical values that have been entered or specified, and the calculated or default values can be used without further user interaction of confirmation. Additionally, wizard 425 can limit a number or range of choices on subordinate related parameters based on decisions and/or values chosen up to a present point. This is achieved by providing wizard 425 with requisite domain knowledge associated with a relationship of the lesser parameters into logical structures and algorithms of wizard 425.

Wizard 425 is also contemplated as having a capability of testing the components of protection system 26. As such, when wizard 425 configures a processor, the processor, in turn, performs a test. For example, the configuration data may cause CCPU 28 to invoke a test to validate the functionality of modules 30A and 30B. Such a test may involve an exchange of data between wizard 425 and CCPU 28, where for example, wizard 425 prompts CCPU 28 to perform the test, and CCPU 28 reports test results, validation results, or other diagnostic feedback to wizard 425.

A user can access wizard 425 through data input/output device 92, which is contemplated as providing a graphic representation of the components of protection system 26, e.g., virtual components. Ordinarily, the user will control the actual components of protection system 26 by manipulating the virtual components on data input/output device 92. As system 10 may include a plurality of circuit breakers 14 and thus protection system 26 includes a plurality of modules 30, data input/output device 92 may be remotely located from some or all of the components of protection system 26. However, an important aspect of testing or controlling the components of system 10 and protection system 26 is that the user know, with certainty, which of the actual components is being tested or controlled. Accordingly, the components of protection system 26 can include an annunciator, i.e., an indicator, where the configuration data causes the indicator to affirmatively indicate an actual component that corresponds to a representation of the component on data input/output device 92. For example, with reference to FIG. 4, modules 30A and 30B each include an LED indicator 445. Assuming that module 30A is located proximate to the circuit breaker 14 that it controls, when the user wishes to identify that particular circuit breaker, the user issues a parameter via data input/output device 92 such that module 30A illuminates LED indicator 445.

Database 435 is a product configuration database. Wizard 425 sends data relating to the configuration of protection system 26 to database 435.

Marketing analysts 430 utilize database 435 for marketing purposes, such as determining an additional product that can be used in protection system 26, and thus, to target the product to the users of protection system 26. For example, by knowing the configuration of protection system 26, marketing analysts 430 may recognize that an additional product can be used as an alternative to an existing component in protection system 26, or that the additional product could enhance the operation of protection system 26.

Field service engineers 440 utilize database 425 for maintenance purposes, such as determining a time for a maintenance operation for protection system 26. That is, by knowing how the components of protection system 26 are being used, field service engineers 440 can offer a preventive or predictive maintenance service for protection system 26.

Note that the operations of marketing analysts 430 and field service engineers 440 need not be performed by humans, but instead, could be automated processes.

It is also contemplated for wizard 425 to receive parameters from database 435 relating to the operation of protection system 26, and to consider such parameters when determining the configuration of the components of protection system 26. For example, database 435 can provide parameters for automatically updating the configuration of the components. Such updates could be initiated by marketing analysts 430 or field service engineers 440. The testing of components via wizard 425, as mentioned above, could also be initiated by marketing analysts 430 or field service engineers 440.

Wizard 425 provides several advantages that are worth noting. It minimizes time required for configuring protection system 26, and minimizes prerequisite knowledge that would otherwise required by an individual tasked to perform the configuration. It assists in quality control in that it minimizes erroneous entries of variable settings. It improves uniformity by reducing variability that may result when a setting is otherwise left to the discretion of an individual. It can be implemented to utilize programmable logic control, and thus relieves individuals from having to write code.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. A computer-implemented method, comprising:
   determining configuration data for a processor in a centralized circuit breaker protection system in accordance with a parameter relating to an operation of said centralized circuit breaker protection system; and
   configuring said processor with said configuration data.

2. The method of claim 1, wherein said processor controls a circuit breaker in said centralized circuit breaker protection system.

3. The method of claim 1, wherein said processor is a central processor for controlling a plurality of circuit breakers in said centralized circuit breaker protection system.

4. The method of claim 1,
   wherein said processor is a first processor for a first circuit breaker, and said configuration data is first configuration data,
   wherein said centralized circuit breaker protection system includes a second processor for a second circuit breaker, and
   wherein said method further comprises:
   determining second configuration data for said second processor in accordance with said parameter; and
   configuring said second processor with said second configuration data.

5. The method of claim 4, wherein said second configuration data is different from said first configuration data.

6. The method of claim 1,
   wherein said parameter is a first parameter, and
   wherein said determining also considers a second parameter such that said configuration data is consistent with both of said first and second parameters.

7. The method of claim 1, wherein said configuring comprises an action selected from the group consisting of configuring software in said processor, configuring firmware in said processor, installing software in said processor, and updating an operating system in said processor.

8. The method of claim 1, wherein said configuring comprises configuring said processor to perform a test in said centralized circuit breaker protection system.

9. The method of claim 1, wherein said configuring comprises controlling an indicator located proximate to a circuit breaker in said centralized circuit breaker protection system.

10. The method of claim 1, wherein said method is executed by an interface that assists a user in performing said configuring.

11. The method of claim 1, further comprising sending data relating to said configuring to a database, wherein said database is used for a purpose selected from the group consisting of (a) determining an additional product for use in said centralized circuit breaker protection system, and (b) determining a time for a maintenance operation for said centralized circuit breaker protection system.

12. An apparatus comprising a module for:
   determining configuration data for a processor in a centralized circuit breaker protection system in accordance with a parameter relating to an operation of said centralized circuit breaker protection system; and
   configuring said processor with said configuration data.

13. The apparatus of claim 12, wherein said processor controls a circuit breaker in said centralized circuit breaker protection system.

14. The apparatus of claim 12, wherein said processor is a central processor for controlling a plurality of circuit breakers in said centralized circuit breaker protection system.

15. The apparatus of claim 12,
   wherein said processor is a first processor for a first circuit breaker, and said configuration data is first configuration data, wherein said centralized circuit breaker protection system includes a second processor for a second circuit breaker, and wherein said module is further for:

determining second configuration data for said second processor in accordance with said parameter; and configuring said second processor with said second configuration data.

16. The apparatus of claim 15, wherein said second configuration data is different from said first configuration data.

17. The apparatus of claim 12, wherein said parameter is a first parameter, and wherein said determining also considers a second parameter such that said configuration data is consistent with both of said first and second parameters.

18. The apparatus of claim 12, wherein said configuring comprises an action selected from the group consisting of configuring software in said processor, configuring firmware in said processor, installing software in said processor, and updating an operating system in said processor.

19. The apparatus of claim 12, wherein said configuring comprises configuring said processor to perform a test in said centralized circuit breaker protection system.

20. The apparatus of claim 12, wherein said configuring comprises controlling an indicator located proximate to a circuit breaker in said centralized circuit breaker protection system.

21. The apparatus of claim 12, wherein said module is part of an interface that assists a user in performing said configuring.

22. The apparatus of claim 12, wherein said module is further for sending data relating to said configuring to a database, and wherein said database is used for a purpose selected from the group consisting of (a) determining an additional product for use in said centralized circuit breaker protection system, and (b) determining a time for a maintenance operation for said centralized circuit breaker protection system.

23. A storage media that contains instructions for controlling a computer for:

determining configuration data for a processor in a centralized circuit breaker protection system in accordance with a parameter relating to an operation of said centralized circuit breaker protection system; and configuring said processor with said configuration data.

* * * * *